(12) United States Patent
Ohuchi et al.

(10) Patent No.: US 8,201,449 B2
(45) Date of Patent: Jun. 19, 2012

(54) SENSOR

(75) Inventors: Satoshi Ohuchi, Hyogo (JP); Toshiyuki Nozoe, Kyoto (JP); Hiroyuki Aizawa, Osaka (JP)

(73) Assignee: Panasonic Corporation, Osaka (JP)

( * ) Notice: Subject to any disclaimer, the term of this patent is extended or adjusted under 35 U.S.C. 154(b) by 296 days.

(21) Appl. No.: 12/441,451

(22) PCT Filed: Nov. 9, 2007

(86) PCT No.: PCT/JP2007/071760
§ 371 (c)(1),
(2), (4) Date: Mar. 20, 2009

(87) PCT Pub. No.: WO2008/059757
PCT Pub. Date: May 22, 2008

(65) Prior Publication Data
US 2009/0266163 A1  Oct. 29, 2009

(30) Foreign Application Priority Data

Nov. 14, 2006 (JP) .................................. 2006-307438
Jan. 22, 2007 (JP) .................................. 2007-011006
Jan. 22, 2007 (JP) .................................. 2007-011007

(51) Int. Cl.
*G01C 19/00* (2006.01)
*G01P 3/44* (2006.01)
*G01P 9/00* (2012.01)
*G01P 15/08* (2006.01)

(52) U.S. Cl. .................................................. 73/504.12
(58) Field of Classification Search ................ 73/504.12
See application file for complete search history.

(56) References Cited

U.S. PATENT DOCUMENTS

| 5,145,040 | A * | 9/1992 | Fladung | 191/12.2 R |
| 5,415,040 | A * | 5/1995 | Nottmeyer | 73/514.02 |
| 5,567,880 | A * | 10/1996 | Yokota et al. | 73/514.33 |
| 6,082,197 | A * | 7/2000 | Mizuno et al. | 73/514.36 |
| 6,698,292 | B2 * | 3/2004 | Kikuchi | 73/662 |
| 6,823,747 | B2 * | 11/2004 | Hasegawa et al. | 73/862.52 |
| 7,188,525 | B2 * | 3/2007 | Machida et al. | 73/504.16 |
| 2003/0066350 | A1 * | 4/2003 | Machida et al. | 73/504.15 |
| 2004/0246648 | A1 | 12/2004 | Katou et al. | |
| 2006/0107739 | A1 * | 5/2006 | Ogura | 73/504.12 |
| 2009/0266163 | A1 * | 10/2009 | Ohuchi et al. | 73/504.12 |

(Continued)

FOREIGN PATENT DOCUMENTS

EP   1342986 A2   9/2003

(Continued)

OTHER PUBLICATIONS

International Search Report for PCT/JP2007/071760.

(Continued)

*Primary Examiner* — Lisa Caputo
*Assistant Examiner* — Jamel Williams
(74) *Attorney, Agent, or Firm* — Pearne & Gordon LLP

(57) ABSTRACT

A sensor includes detecting element (28) with an acceleration sensor, which is formed of weight (18) coupled to rigid section (14) via flexible section (16), substrate (10) confronting weight (18), and an electrode section including opposed electrodes (20, 22, 24, 26) placed on respective opposed faces of weight (18) and substrate (10). This structure prevents weight (18) from moving along Z-axis, so that a detection accuracy of acceleration occurring along X-axis or Y-axis can be improved.

15 Claims, 11 Drawing Sheets

U.S. PATENT DOCUMENTS

| | | | |
|---|---|---|---|
| 2010/0071468 A1* | 3/2010 | Ohuchi et al. | 73/504.12 |
| 2010/0107764 A1* | 5/2010 | Uemura et al. | 73/514.32 |
| 2010/0199761 A1* | 8/2010 | Uemura | 73/504.12 |
| 2010/0218604 A1* | 9/2010 | Terada | 73/504.12 |
| 2010/0229645 A1* | 9/2010 | Aizawa et al. | 73/504.12 |
| 2011/0203371 A1* | 8/2011 | Ohuchi et al. | 73/504.12 |

FOREIGN PATENT DOCUMENTS

| | | | |
|---|---|---|---|
| GB | 2194341 A | | 3/1988 |
| JP | 05-264577 A | | 10/1993 |
| JP | 05264577 A | * | 10/1993 |
| JP | 08-094666 A | | 4/1996 |
| JP | 2001-074767 A | | 3/2001 |
| JP | 2001-208546 A | | 8/2001 |
| JP | 2003-329444 A | | 11/2003 |
| JP | 2006-162314 A | | 6/2006 |
| JP | 2009222476 A | * | 10/2009 |
| JP | 2010230346 A | * | 10/2010 |

OTHER PUBLICATIONS

Chinese Office action dated Jun. 2, 2010.

English translation of JP 05-264577-A, which was previously cited in the IDS dated Mar. 16, 2009.

English translation of JP 2006-162314-A, which was previously cited in the IDS dated Mar. 16, 2009.

Foreign Office action for application 07 831 941.1-2213 dated Feb. 20, 2012.

Foreign Office action for application 07831491.1-2213 / 2053413 dated Oct. 13, 2011.

* cited by examiner

SENSOR

TECHNICAL FIELD

The present invention relates to a sensor for detecting acceleration and angular velocity, and the sensor is to be used in a variety of electronic devices which perform attitude-control or navigation for mobile carriers such as airplanes, cars, robots, vessels, or vehicles.

BACKGROUND ART

A conventional acceleration sensor is described with reference to FIG. 20. The conventional acceleration sensor comprises the following elements: rigid substrate 101, base glass 102 placed on rigid substrate 101, flexible substrate 103 placed on base glass 102, weight 104 placed on the underside of flexible substrate 103, glass substrate 105 placed above and confronting flexible substrate 103, and opposed electrodes 106 placed on respective opposed faces of flexible substrate 103 and glass substrate 105 (disclosed in Patent Document 1).

The way of detecting acceleration with the foregoing sensor is described hereinafter. When acceleration occurs, weight 104 is going to move along an accelerating axial direction, so that flexible substrate 103, to which weight 104 is attached, is somewhat bent. Then the distance between flexible substrate 103 and glass substrate 105 changes, whereby an electrostatic capacity between opposed electrodes 106 is varied. The sensor thus detects the acceleration based on the variation caused by the change in the distance between opposed electrodes 106.

The acceleration sensor discussed above is placed, corresponding to an axis to be sensed, in an attitude control device or a navigation system of mobile carriers such as vehicles.

Although the sensor detects acceleration based on a change in the capacity between opposed electrodes 106, weight 104 tends to change its place along Z-axis because weight 104 is placed on the underside of flexible substrate 103 such that weight 104 floats in midair and above rigid substrate 101.

For instance, if weight 104 moves along Z-axis such that opposed electrodes 106 become away from each other, the electrostatic capacity between opposed electrodes 106 becomes smaller. When acceleration along X-axis or Y-axis occurs in this state, a change in the electrostatic capacity between opposed electrodes 106 becomes smaller than a supposed one, so that a detection accuracy of the acceleration along X-axis or Y-axis is degraded.

Next, another conventional sensor for detecting angular velocity and acceleration is described hereinafter. This sensor is disclosed in, e.g. patent document 2 and patent document 3.

A sensor dedicated to angular velocity or a sensor dedicated to acceleration has been used for detecting the angular velocity or the acceleration independently. Various electronic devices, which need to detect both of angular velocity and acceleration, should be thus equipped with multiple sensors mounted on the substrate for detecting acceleration and angular velocity respectively.

The angular-velocity sensor, in general, senses a distortion of a detecting element electrically, thereby detecting angular velocity. The detecting element shapes like a tuning fork, H-shape, or T-shape, and vibration of this detecting element produces Coriolis force, which is accompanied by the distortion of the detecting element. On the other hand, the acceleration sensor, as previously discussed, includes weight 104, and acceleration is accompanied by movement of weight 104. The sensor then compares the movement with a state prior to the movement, thereby detecting acceleration.

The angular-velocity sensor and the acceleration sensor discussed above are placed, corresponding to an axis to be sensed, in an attitude control device or a navigation system of mobile carriers such as vehicles. However, the foregoing structure needs a space on a substrate for mounting both of the angular-velocity sensor and the acceleration sensor corresponding to the axes to be sensed, where angular velocity and acceleration are supposed to occur. As a result, the electronic device has resisted being downsized.

Patent Document 1: Unexamined Japanese Patent Application Publication No. H10-177034

Patent Document 2: Unexamined Japanese Patent Application Publication No. 2001-208546

Patent Document 3: Unexamined Japanese Patent Application Publication No. 2001-74767

DISCLOSURE OF INVENTION

The present invention addresses the problem discussed above, and aims to provide a sensor which allows preventing its weight from moving along Z-axis and improving an accuracy of detecting acceleration along X-axis or Y-axis. This sensor also allows reducing a space for mounting a detecting element, so that the sensor can be downsized.

The sensor of the present invention comprises the following structural elements:

a detecting element including an acceleration sensor which includes;
  a weight connected to a rigid section via a flexible section;
  a substrate confronting the weight; and
  an electrode section formed of opposed electrodes each of them placed on respective opposed faces of the weight and the substrate.

The structure discussed above allows preventing the weight from moving along Z-axis, thereby improving an accuracy of detecting acceleration along X-axis or Y-axis.

It is preferable to provide the acceleration sensor with a pressing section for pressing the weight or the flexible section, and to allow the sensor to detect acceleration by detecting a change in electrostatic capacity between the opposed electrodes.

The foregoing structure allows applying depression force anytime to the weight or the flexible section that connects the rigid section to the weight. For instance, when the pressing section depresses the weight or the flexible section along Z-axis, the weight is prevented from moving along Z-axis, so that the face-to-face distances between each one of the opposed electrodes placed on the respective opposed faces of the weight and the substrate resist being away from each other. As a result, the detection accuracy of the acceleration occurring along X-axis or Y-axis can be prevented from degrading.

It is preferable that the substrate is formed of a first substrate and a second substrate opposing to each other and sandwiching the weight along a gravitational direction, and the opposed electrodes are placed on the respective opposed faces of the weight, the first substrate and the second substrate. The acceleration sensor detects a change in the electrostatic capacity between the opposed electrodes, thereby detecting acceleration.

Assume that gravity is directed along Z-axis in the foregoing structure, and then even if the weight moves along Z-axis, a greater distance between the first substrate and the weight will reduce the distance between the second substrate and the weight. A shorter distance between the first substrate and the weight will increase the distance between the second substrate and the weight. In other words, the total distance between the weight and the first substrate and between the weight and the second substrate stays unchanged, so that the total electrostatic capacity between the opposed electrodes resists decreasing even if the weight moves along Z-axis. As a result, the detection accuracy of the acceleration occurring along X-axis or Y-axis can be prevented from degrading.

It is preferable that the detecting element of the present invention further includes an angular velocity sensor, which comes with another electrode section placed on the flexible section. The electrode section placed on the weight and this another electrode section placed on the flexible section include an upper electrode and a lower electrode respectively, and a piezoelectric layer exists between the upper electrode and the lower electrode. The acceleration sensor shorts the upper electrode and the lower electrode of the electrode placed on the weight, and senses an electrostatic capacity between the opposed electrodes placed on the respective opposed faces of the weight and the substrate, thereby detecting acceleration. The angular velocity sensor, on the other hand, senses a change in status of the flexible section, i.e. a bent due to Coriolis force, with the another electrode, thereby detecting angular velocity.

The foregoing structure allows the acceleration sensor to senses an electrostatic capacity between the opposed electrodes placed on the respective opposed faces of the weight and the substrate, thereby detecting acceleration, and allows the angular velocity sensor to senses a change in the status of the flexible section, i.e. a bent due to Coriolis force, with the another electrode. A single detecting element can thus detect both of the acceleration and the angular velocity, a mounting area for components can be reduced, thereby downsizing the sensor. The electrode section of the acceleration sensor and the another electrode section of the angular velocity sensor, in particular, include respectively the upper electrode and the lower electrode between which the piezoelectric layer exists, so that they can be formed in the same manufacturing step. As a result, not only the downsizing is achievable but also the productivity can be improved.

The opposed electrode placed on the weight shorts the upper electrode and the lower electrode with the piezoelectric layer existing therebetween, so that no electrostatic capacity occurs therebetween. As a result, this structure prevents the detection accuracy from degrading.

Figure 1:
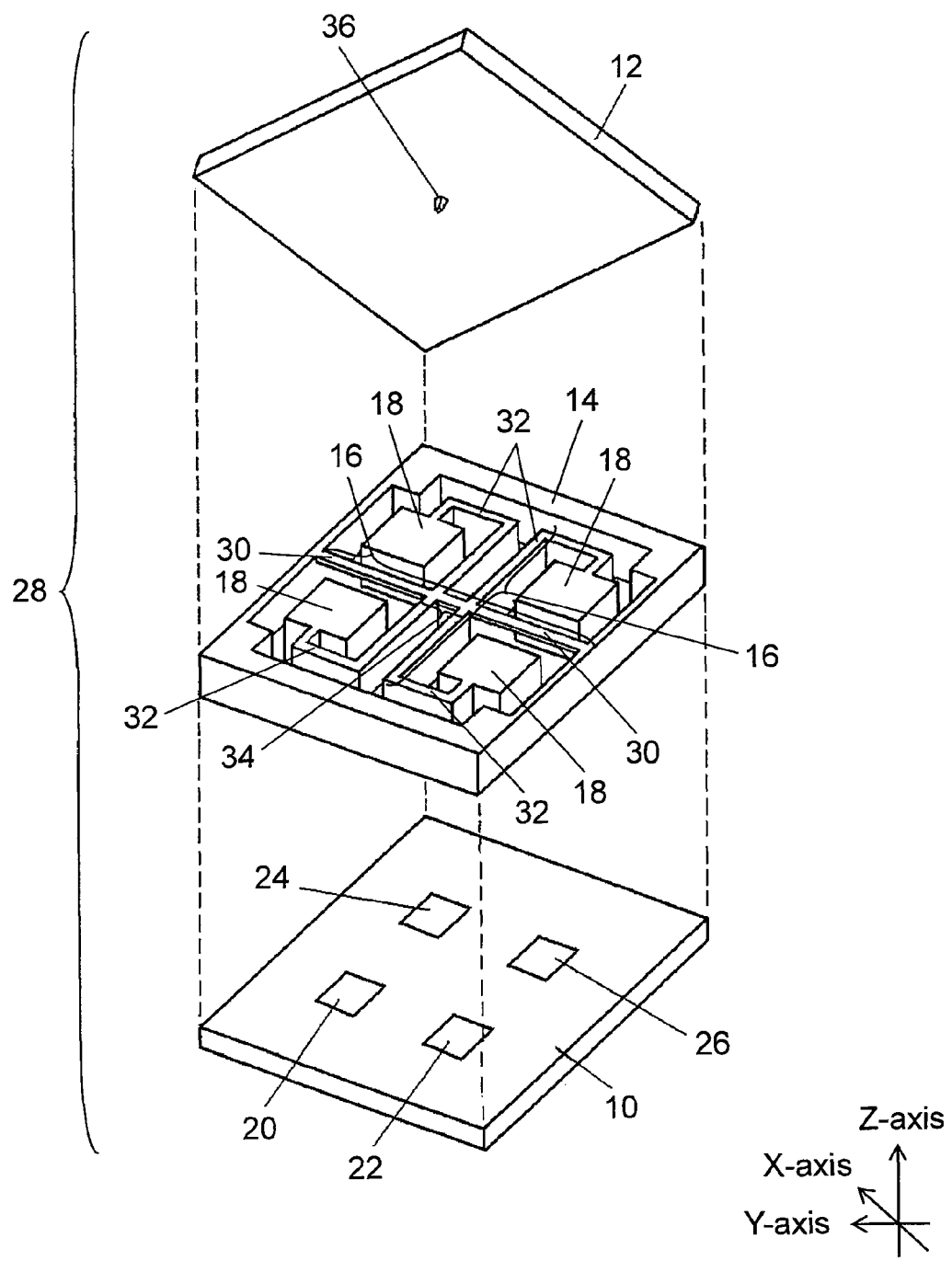
FIG. 1 shows an exploded perspective view of an acceleration sensor in accordance with a first embodiment of the present invention.

DESCRIPTION OF REFERENCE MARKS 10 first substrate
12 second substrate
14, 54 rigid section
16 flexible section
18, 52 weight
20, 64 first opposed electrode
21 fifth opposed electrode
22, 66 second opposed electrode
23 sixth opposed electrode
24, 68 third opposed electrode
25 seventh opposed electrode
26, 70 fourth opposed electrode
27 eighth opposed electrode
28, 51 detecting element
30, 58 first arm
32, 60 second arm
34, 62 supporter
36 pressing section
56 substrate
72 driving electrode
74 detecting electrode
76 first sensing electrode
78 second sensing electrode
80 piezoelectric layer
82 upper electrode
84 lower electrode

PREFERRED EMBODIMENTS

Exemplary embodiments of the present invention are demonstrated hereinafter with reference to the accompanying drawings.

Embodiment 1

Figure 2:
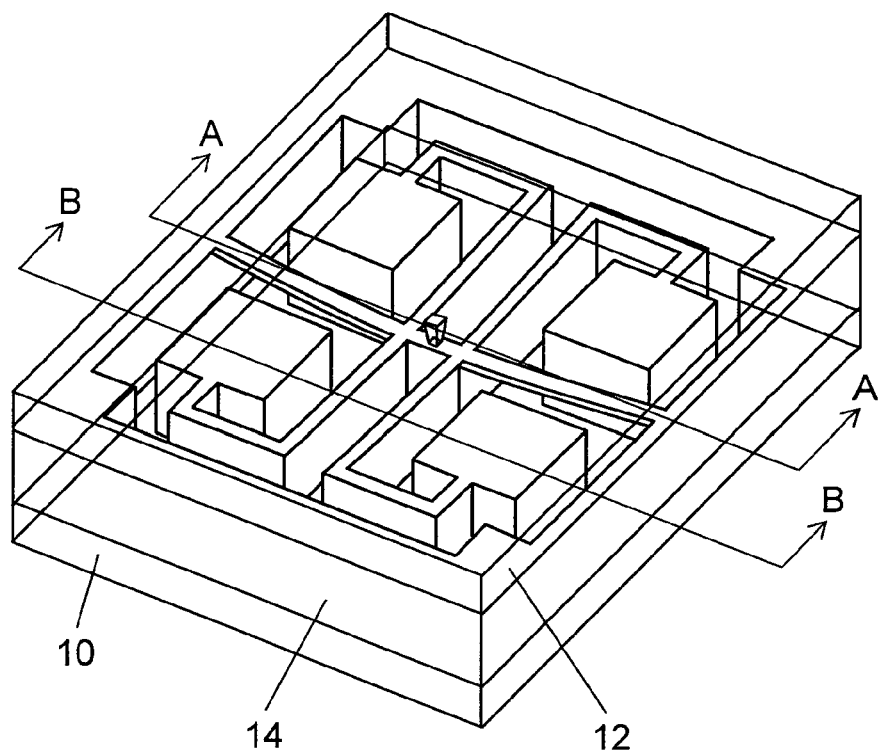
FIG. 2 shows a perspective view in parts of the acceleration sensor shown in FIG. 1.
Figure 3:
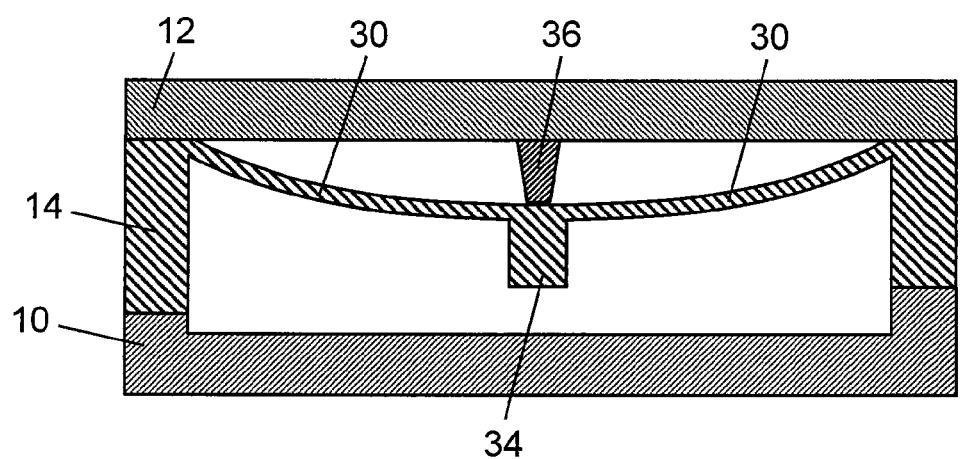
FIG. 3 shows a sectional view of the acceleration sensor cut along line A-A in FIG. 2.
Figure 4:
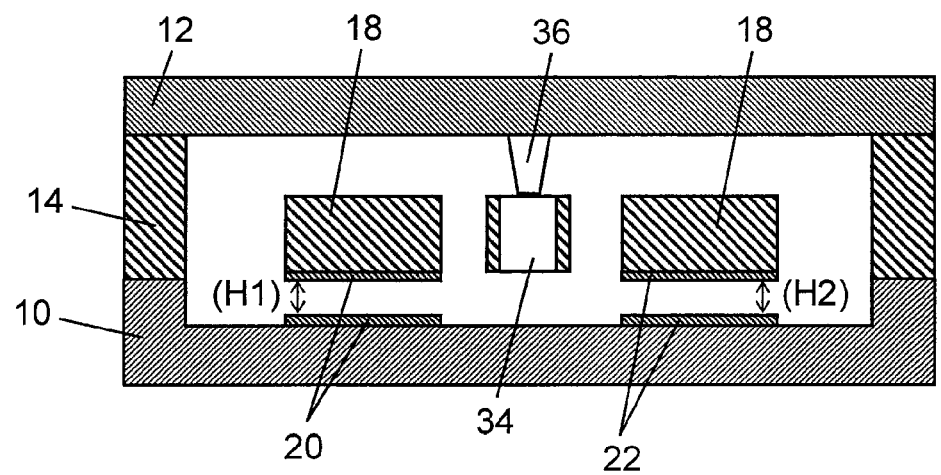
FIG. 4 shows a sectional view of the acceleration sensor cut along line B-B in FIG. 2.

FIG. 1 shows an exploded perspective view of an acceleration sensor in accordance with a first embodiment of the present invention. FIG. 2 shows a perspective view in parts of the same acceleration sensor. FIG. 3 shows a sectional view cut along line A-A in FIG. 2. FIG. 4 shows a sectional view cut along line B-B in FIG. 2.

In FIG. 1-FIG. 4 the acceleration sensor in accordance with the first embodiment of the present invention includes detecting element 28 that comprises the following structural elements:
- first substrate 10;
- second substrate 12 confronting first substrate 10;
- rigid section 14 placed between first substrate 10 and second substrate 12 and fixed to both of substrates 10 and 12;
- weight 18 connected to rigid section 14 via flexible section 16; and
- first opposed electrodes-fourth opposed electrodes 20, 22, 24, and 26 placed on respective opposed faces of weight 18 and first substrate 10.

First substrate 10 of the first embodiment corresponds to the substrate described in the "DISCLOSURE OF INVENTION".

Detecting element 28 includes two orthogonal arms, and each of them is formed by connecting one first arm 30 to two second arms 32 along an orthogonal direction, and supporter 34 for supporting first ends of two first arms 30. Two first arms 30 and supporter 34 are placed linearly and approximately on the same straight line. Each one of first arms 30 is formed tremendously thinner than each one of second arms 32, and a second end of each one of first arms 30 is connected to frame-like rigid section 14. Each one of second arms 32 is bent to form a J-shape so that a tip of the bent portion confronts the remaining portion. Weight 18 is connected to the tip of the bent portion of second arm 32. First arms 30 are placed symmetrically with respect to the center of detecting element 28, and second arms 32 are also placed symmetrically with respect to the center of detecting element 28. In this embodiment, each one of four second arms 32 corresponds to the arm described in the "DISCLOSURE OF INVENTION". Flexible section 16 is referred to as a portion that connects rigid section 14 to weight 18, and corresponds to first arms 30, second arms 32, and supporter 34.

First and second substrates 10, 12, rigid section 14, flexible section 16, and weight 18 are made of silicon-based material (including glass or a material of which linear expansion coefficient is close to that of silicon), and rigid section 14, flexible section 16, and weight 18 are unitarily molded. First and second substrates 10 and 12 are directly bonded to and fixed to rigid section 14. Adhesive or bumps can be used instead of the direct-bonding; however, the direct-bonding needs not taking a thickness of the adhesive or the bumps into consideration, so that the direct-bonding can produce the better accuracy.

Pressing section 36 is fixed to or formed on second substrate 12 for depressing supporter 34. As shown in FIGS. 3 and 4, pressing section 36 depresses supporter 34 along the gravitational direction, thereby applying tensile stress to flexible section 16 (first arm 30, second arm, 32, and supporter 34). At this time, since pressing section 36 depresses supporter 34, the distance (H) between first substrate 10 and first, third opposed electrodes 20, 24 becomes shorter than a distance with no application of pressing force thereto.

Pressing section 36 shapes like a spindle, and tapers toward the center of detecting element 28, and depresses supporter 34 with point-contact. Pressing section 36 can be a bar-like or needle-like shape, and it can press weight 18 or flexible section 16. Supporter 34 corresponds to a part of flexible section 16.

Supporter 34 is formed at a thickness identical to that of second arm 32 in this embodiment; however, it can be formed at a thickness similar to that of first arm 30.

Figure 5:
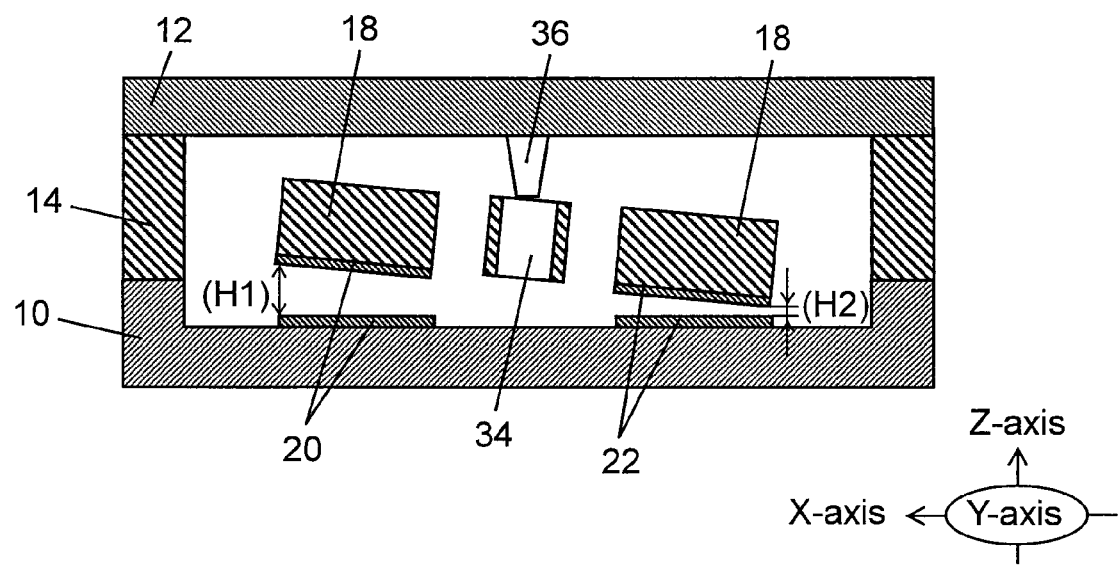
FIG. 5 shows a sectional view of the acceleration sensor, in sensing acceleration, cut along line B-B in FIG. 2.

Detection of acceleration is demonstrated hereinafter. X-axis, Y-axis and Z-axis are orthogonally placed to each other, and assume that first substrate 10 is placed on XY plane, then acceleration occurs along X-axis as shown in FIG. 5. In this case, weight 18 is going to rotate on the contact point (pressing section 36 point-contacts with supporter 34) around Y-axis, so that distance H1 between first opposed electrodes 20 and between third opposed electrodes 24 becomes greater, and distance H2 between second opposed electrodes 22 and between fourth electrodes 26 becomes smaller.

In a similar way, when acceleration occurs along Y-axis, weight 18 is going to rotate on the contact point between weight 18 and pressing section 36 around X-axis, so that, although it is not illustrated, a distance between first opposed electrodes 20 and between second opposed electrodes 22 becomes greater, and a distance between third opposed electrodes 24 and between fourth opposed electrodes 26 becomes smaller.

Electrostatic capacities between respective electrodes thus change, so that the acceleration along X-axis or Y-axis can be detected based on the change in the electrostatic capacity.

The foregoing structure includes pressing section 36 for depressing supporter 34 that is a part of flexible section 16, so that flexible section 16, which connects rigid section 14 to weight 18, always receives the depressing force from pressing section 36. For instance, when pressing section 36 depresses weight 18 along Z-axis, weight 18 can be prevented from moving along Z-axis, and distances between all the opposed electrodes placed weight 18 and first substrate 10 can be prevented from getting greater. As a result, a detection accuracy of acceleration occurring along X-axis or Y-axis can be prevented from degrading.

Figure 6:
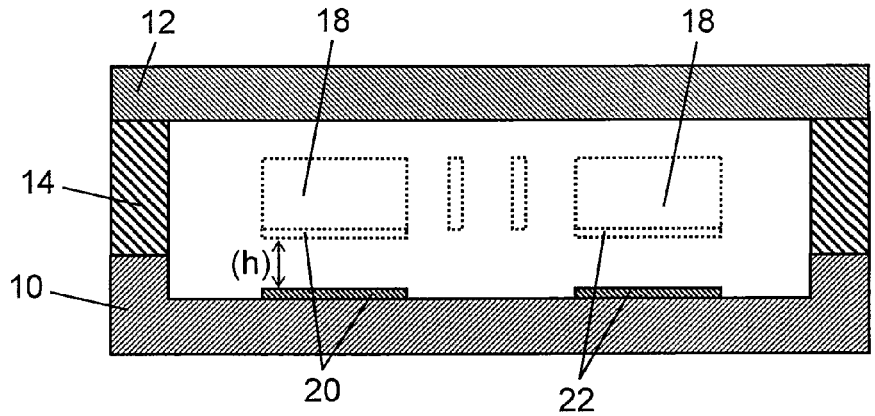
FIG. 6 shows a sectional view of the acceleration sensor, where no pressing section is formed, cut along line B-B in FIG. 2.
Figure 7:
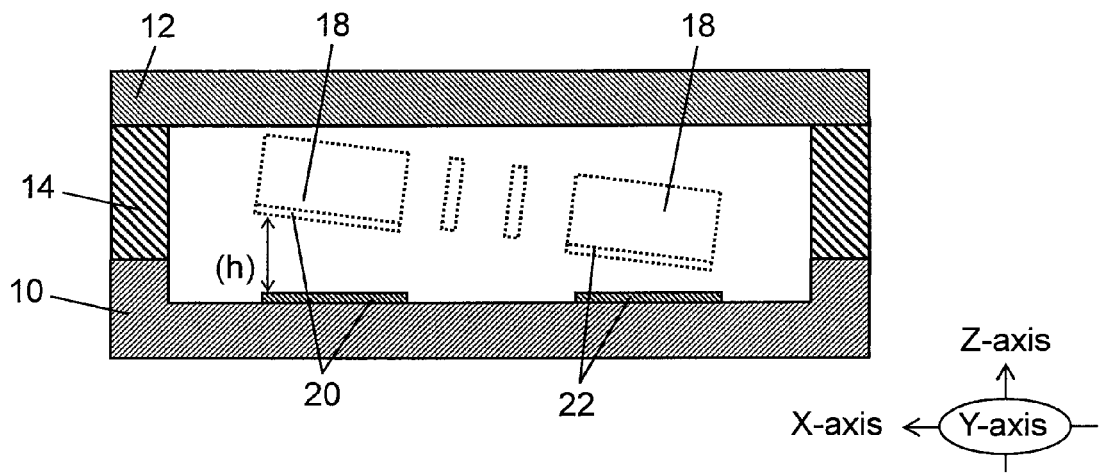
FIG. 7 shows a sectional view of the acceleration sensor, where acceleration occurs and no pressing section is formed, cut along line B-B in FIG. 2.

If there were no pressing section 36 as shown in FIG. 6, weight 18 and flexible section 16 move along Z-axis, so that the distance (h) between first opposed electrodes 20 and between third opposed electrodes 24 sometimes becomes greater. At this time, if acceleration occurs along X-axis, the distance (h) becomes greater as shown in FIG. 7, therefore, a change in electrostatic capacity between first and third opposed electrodes 20 and 24 sometimes cannot be detected satisfactorily.

Pressing section 36 depresses supporter 34, a part of flexible section 16, for applying tensile stress to flexible section 16, so that weight 18 can be positively prevented from moving along Z-axis. Supporter 34, which is a part of flexible section 16, is depressed in particular along the same direction as the gravitational direction, weight 18 resists moving in the direction opposite to the gravitational direction. As a result, distances between the respective opposed electrodes placed on weight 18 and first substrate 10 resist becoming greater, so that the detection accuracy can be positively prevented from degrading.

Pressing section 36 shapes like a spindle and point-contacts with weight 18, so that weight 18 can be prevented from moving along Z-axis, while acceleration along X-axis or Y-axis prompts weight 18 to tend to rotate on the point contact (on supporter 34) around X-axis or Y-axis, so that the electrostatic capacity can be changed with ease. As a result, a detection accuracy can be improved.

Flexible section 16 including first arms 30, second arms 22, supporter 34 is placed symmetrically with respect to the center (supporter 34) of detecting element 28, so that a depression by pressing section 36 onto weight 18 will maintain the distances equal to each other between first and third electrodes 20 and 24, and between second and fourth electrodes 22 and 26 provided no acceleration occurs. As a result, degradation in detection accuracy caused by a difference in those face-to-face distances between the electrodes can be prevented.

Flexible section 16 is formed of at least four arms (first arms 30, second arms 32), so that when acceleration occurs along X-axis and/or Y-axis, weight 18 tends to rotate around X-axis and/or Y-axis on the contact point (supporter 34) with pressing section 36. As a result, acceleration along X-axis and/or Y-axis can be detected respectively. A placement of four arms in a crisscross pattern and along X-Y direction allows weight 18 to rotate around X-axis and Y-axis with more ease, so that acceleration along X-axis and Y-axis can be detected simultaneously with more ease.

First substrate 10, rigid section 14, flexible section 16, and weight 18 are made of silicon-based material. Rigid section 14, flexible section 16, and weight 18 are unitarily molded, and rigid section 14 is directly bonded to first substrate 10. This structure produces less dispersion than those elements discretely formed, and is excellent in dimensional accuracy as a whole, so that the detection accuracy can be improved.

Embodiment 2

Figure 8:
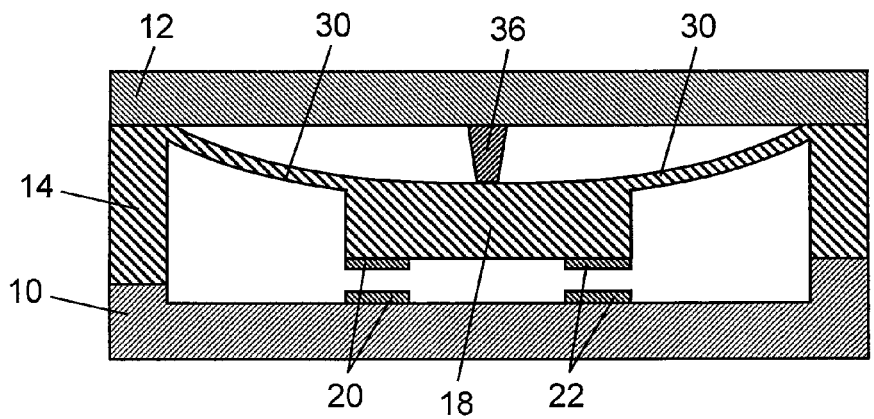
FIG. 8 shows a sectional view of an acceleration sensor in accordance with a second embodiment of the present invention.

The first embodiment discussed previously refers to pressing section 36 that depresses flexible section 16. However, as shown in FIG. 8, pressing section 36 can depress weight 18 provided that detecting element 28 has weight 18 at its center. This structure produces a similar advantage to that of the first embodiment.

In the first and second embodiments, pressing section 36 is fixed to or formed on second substrate 12; however, pressing section 36 can be fixed to or formed on flexible section 16 (first arms 30, second arms 32, and supporter 34) so that second substrate 12 can depress pressing section 36.

Embodiment 3

Detecting element 28 in accordance with the first and second embodiments discussed previously includes pressing section 36 that depresses weight 18 or flexible section 16. In this third embodiment, instead of pressing section 36, second substrate 12 is placed confronting first substrate 10 and sandwiching weight 18 therebetween along the gravitational direction. Second substrate 12 is equipped with opposed electrodes.

Figure 9:
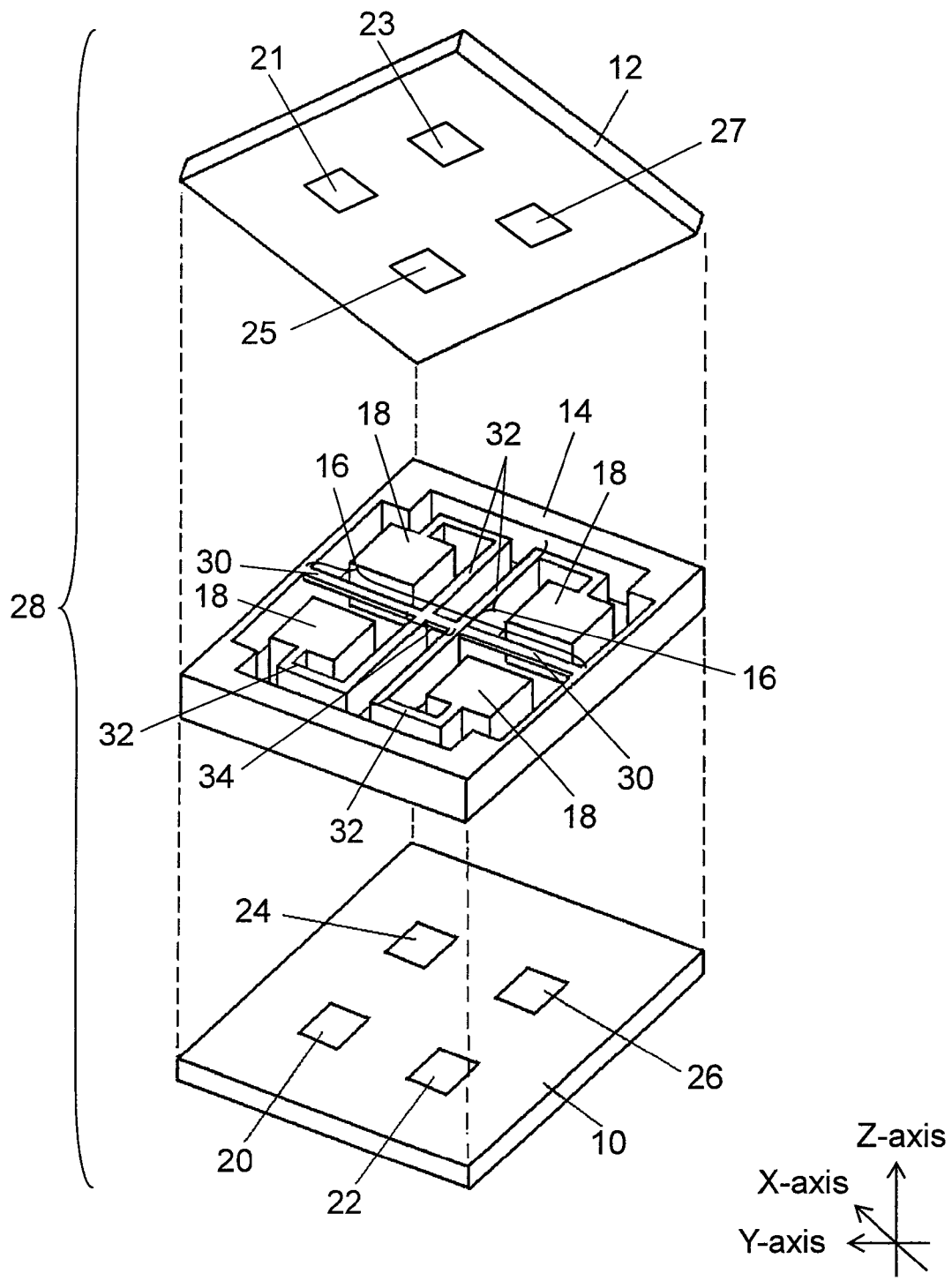
FIG. 9 shows an exploded perspective view of an acceleration sensor in accordance with a third embodiment of the present invention.
Figure 10:
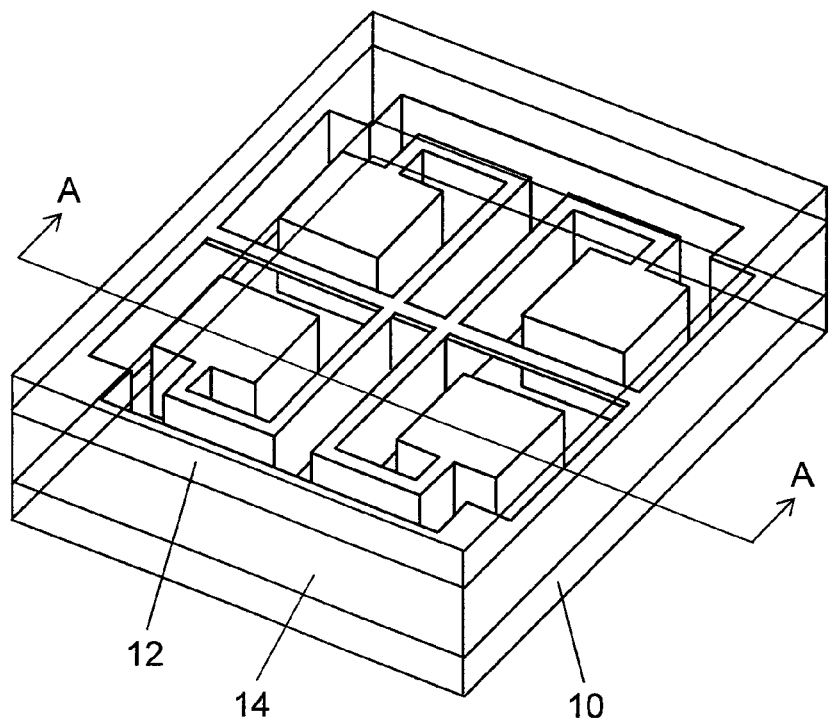
FIG. 10 shows a perspective view in parts of the acceleration sensor shown in FIG. 9.

FIG. 9 shows an exploded perspective view of an acceleration sensor in accordance with the third embodiment. FIG. 10 shows a perspective view in parts of the acceleration sensor, and FIG. 11 shows a sectional view cut along line A-A in FIG. 10.

Figure 11:
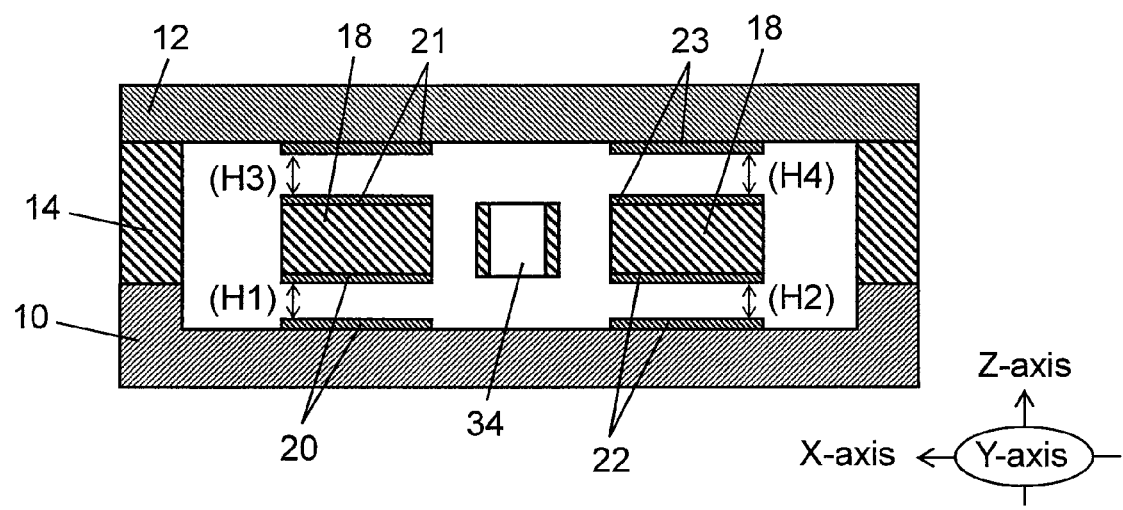
FIG. 11 shows a sectional view of the acceleration sensor cut along line A-A in FIG. 10.

In FIG. 9-FIG. 11, the acceleration sensor in accordance with the third embodiment includes detecting element 28 equipped with an acceleration detecting section. Detecting element 28 comprises the following elements:
first substrate 10;
second substrate 12 confronting first substrate 10;
rigid section 14 placed between first substrate 10 and second substrate 12 and fixed to both of substrates 10 and 12;
weight 18 connected to rigid section 14 via flexible section 16. First substrate 10 and second substrate 12 confront each other and sandwich weight 18 along the gravitational direction.

On the respective opposed faces of weight 18 and first substrate 10, first-fourth opposed electrodes 20, 22, 24, 26 are placed, and fifth-eighth opposed electrodes 21, 23, 25, 27 are placed on the respective opposed faces of weight 18 and second substrate 12. In other words, first and second substrates 10 and 12 correspond the substrate described in the section of "DISCLOSURE OF INVENTION".

Similar to the first embodiment, detecting element 28 includes two orthogonal arms formed by connecting one first arm 30 to two second arms 32 along an orthogonal direction, and supporter 34 for supporting first ends of two first arms 30. Two first arms 30 and supporter 34 are placed linearly and approximately on the same straight line. Each one of first arms 30 is formed tremendously thinner than each one of second arms 32, and a second end of each one of first arms 30 is connected to frame-like rigid section 14. Each one of second arms 32 is bent to form a J-shape so that a tip of the bent portion confronts the remaining portion. Weight 18 is connected to the tip of the bent portion of second arm 32. First arms 30 are placed symmetrically with respect to the center of detecting element 28, and second arms 32 are also placed symmetrically with respect to the center of detecting element 28. In this embodiment, each one of four second arms 32 corresponds to the arm described in the "DISCLOSURE OF INVENTION".

Flexible section 16 is referred to as a portion that connects rigid section 14 to weight 18, and corresponds to first arms 30, second arms 32, and supporter 34.

First and second substrates 10, 12, rigid section 14, flexible section 16, and weight 18 are made of silicon-based material (including glass or a material of which linear expansion coefficient is close to that of silicon), and rigid section 14, flexible section 16, and weight 18 are unitarily molded. First and second substrates 10 and 12 are directly bonded to and fixed to rigid section 14. Adhesive or bumps can be used instead of the direct-bonding; however, the direct-bonding needs not taking a thickness of the adhesive or the bumps into consideration, so that the direct-bonding can produce the better accuracy.

Figure 12:
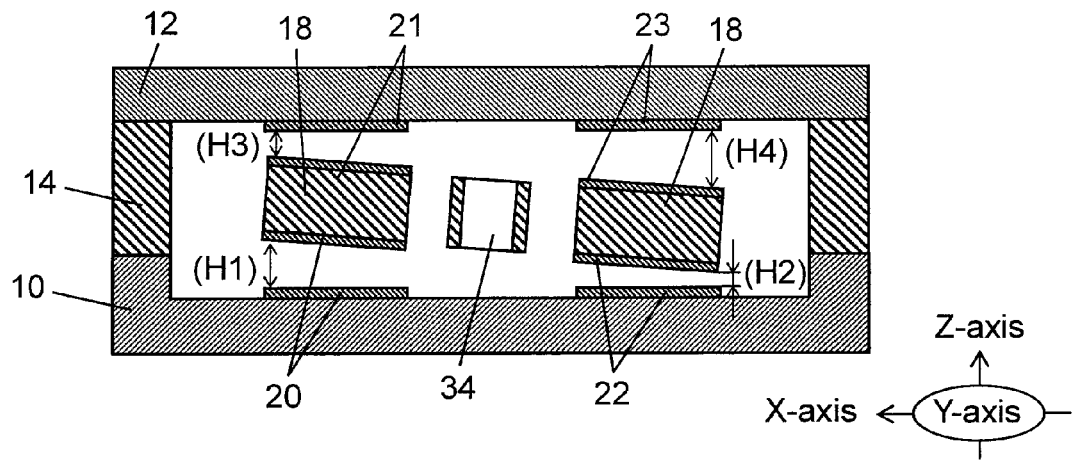
FIG. 12 shows a sectional view of the acceleration sensor, in sensing acceleration, cut along line A-A in FIG. 10.

Next, detection of acceleration is demonstrated hereinafter. X-axis, Y-axis and Z-axis are orthogonally placed to each other, and assume that first substrate 10 is placed on X-Y plane, and then acceleration occurs along X-axis as shown in FIG. 12. In this case, weight 18 is going to rotate on supporter 34 around Y-axis. As a result, as shown in FIG. 9 and FIG. 12, distances (H1) between first opposed electrodes 20 and between third opposed electrodes 24 placed on the respective opposed faces of first substrate 10 and weight 18 become greater, and distances (H4) between sixth opposed electrodes 23 and between eight opposed electrodes 27 also become greater. On the other hand, distances (H2) between second opposed electrodes 22 and between fourth opposed electrodes 26 placed on the respective opposed faces of first substrate 10 and weight 18 become smaller, and distances (H3) between fifth opposed electrodes 5 and between seventh opposed electrodes 25 placed on the respective opposed faces of second substrate 12 and weight 18 become also smaller.

In a similar way, when acceleration occurs along Y-axis, weight 18 is going to rotate on supporter 34 around X-axis. Although it is not illustrated, the distances between first opposed electrodes 20 and between second opposed electrodes 22 become greater, and the distances between seventh opposed electrodes 25 and between eight opposed electrodes 27 become also greater. On the other hands, the distances between third opposed electrodes 24 and between fourth opposed electrodes 26 become smaller, and the distances between fifth opposed electrodes 21 and between sixth opposed electrodes 23 become also smaller.

As discussed above, electrostatic capacities between the respective electrodes change, so that detecting element 28 can detect acceleration along X-axis or Y-axis based on the change in the electrostatic capacity.

Figure 13:
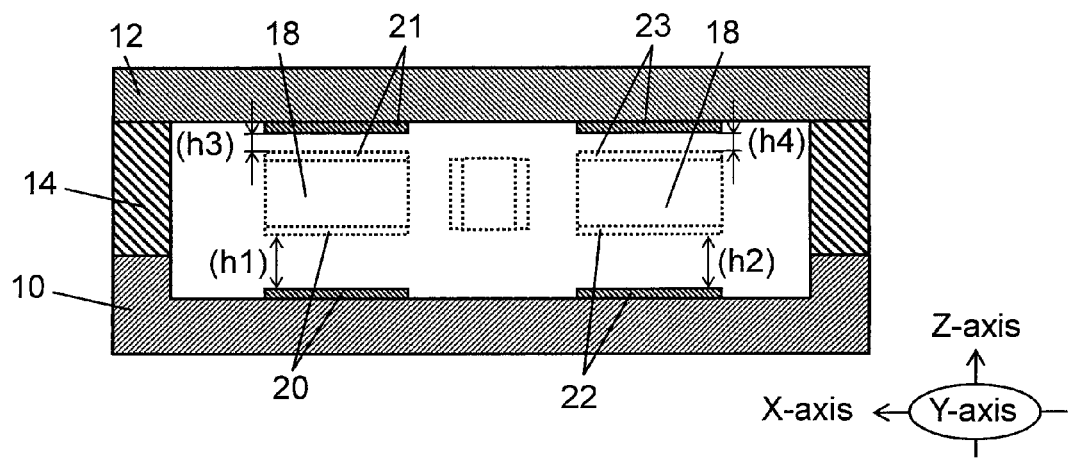
FIG. 13 shows a sectional view of the acceleration sensor, where a weight moves along Z-axis, cut along line A-A in FIG. 10.

As shown in FIG. 13, when weight 18 moves along X-axis, distances h1 and h2 between first substrate 10 and weight 18 become greater, and distances h3 and h4 between second substrate 12 and weight 18 become smaller. To the contrary, smaller distances h1, h2 between first substrate 10 and weight 18 will extend distances h3, h4 between second substrate 12 and weight 18.

Figure 14:
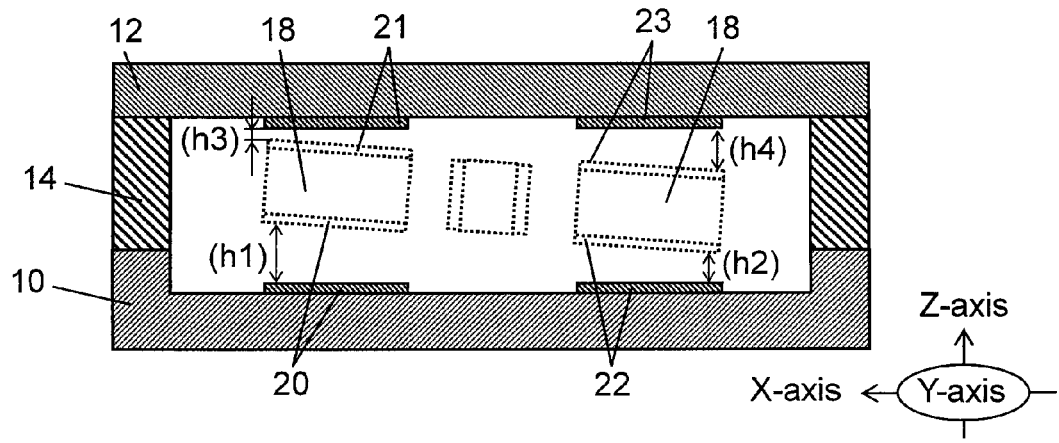
FIG. 14 shows a sectional view of the acceleration sensor, where a weight moves along Z-axis and acceleration occurs, cut along line A-A in FIG. 10.

As FIG. 13 illustrates, when distances h1, h2 between first substrate 10 and weight 18 are extended, and distances h3, h4 between second substrate 12 and weight 18 are reduced, and then acceleration occurs along X-axis in this state, weight 18 is going to rotate on supporter 34 around Y-axis as shown in FIG. 14, where supporter 34 is moved along Z-axis due to the acceleration.

As a result, as shown in FIG. 9 and FIG. 14, distance h1 between first opposed electrodes 20 and between third opposed electrodes 24 placed on the respective opposed faces of first substrate 10 and weight 18 becomes greater, and distance h4 between sixth opposed electrodes 23 and between eighth opposed electrodes 27 placed on the respective opposed faces of second substrate 12 and weight 18 also becomes greater. On the other hand, distance h2 between second opposed electrodes 22 and between fourth opposed electrodes 26 placed on the respective opposed faces of first substrate 10 and weight 18 becomes smaller, and distance h3 between fifth opposed electrodes 21 and between seventh opposed electrodes 25 placed on the respective opposed faces of second substrate 12 and weight 18 also becomes smaller.

In this case, the total distance h1+h3, namely, distance h1 between weight 18 and first substrate 10 plus distance h3 between weight 18 and second substrate 12, stays unchanged from the total distance H1+H3 where weight 18 is not moved along Z-axis. Thus if weight 18 moves along Z-axis, the total electrostatic capacity hardly becomes smaller, so that the detection accuracy can be improved free from degrading the detection accuracy of acceleration which occurs along X-axis or Y-axis.

The foregoing structure includes first and second substrates 10 and 12 confronting each other and sandwiching weight 18 along the gravitational direction, weight 18, and opposed electrodes 20-27 placed on the respective opposed faces of weight 18, first and second substrates 10 and 12. Movement of weight 18 along the gravitational direction will change the distances between first substrate 10 and weight 18, and between second substrate 12 and weight 18 as follows:

For instance, assume that the gravitational direction refers to Z-axis, then even if weight 18 moves along Z-axis, a greater distance between first substrate 10 and weight 18 will reduce the distance between second substrate 12 and weight 18, and vice versa.

In other words, since the total distance of a distance between weight 18 and first substrate 10 plus a distance between weight 18 and second substrate 12 remains unchanged, a movement of weight 18 along Z-axis will hardly reduce the entire electrostatic capacity. The detection accuracy of acceleration occurring X-axis or Y-axis can be thus prevented from degrading.

Flexible section 16 (first arms 30, second arms 32, supporter 34) is placed symmetrically with respect to the center (supporter 34) of detecting element 28, so that a difference in detection accuracies can be reduced.

Flexible section 16 is formed of at least four arms (first arms 30, second arms 32), so that when acceleration occurs along X-axis and/or Y-axis, weight 18 tends to rotate around X-axis and/or Y-axis on supporter 34. As a result, acceleration along X-axis and/or Y-axis can be detected. A placement of four arms in a crisscross pattern and along X-Y direction allows weight 18 to rotate around X-axis and/or Y-axis with more ease, so that acceleration along X-axis and Y-axis can be detected with more ease.

First substrate 10, rigid section 14, flexible section 16, and weight 18 are made of silicon-based material. Rigid section 14, flexible section 16, and weight 18 are unitarily molded, and rigid section 14 is directly bonded to first substrate 10. This structure produces less dispersion than those elements discretely formed, and is excellent in dimensional accuracy as a whole, so that the detection accuracy can be improved.

Embodiment 4

Embodiments 1-3 discussed previously refer to the sensor including detecting element 28 that is equipped with only an acceleration detector. In this fourth embodiment, the detecting element is equipped with both of the acceleration sensor and an angular velocity sensor.

Figure 15:
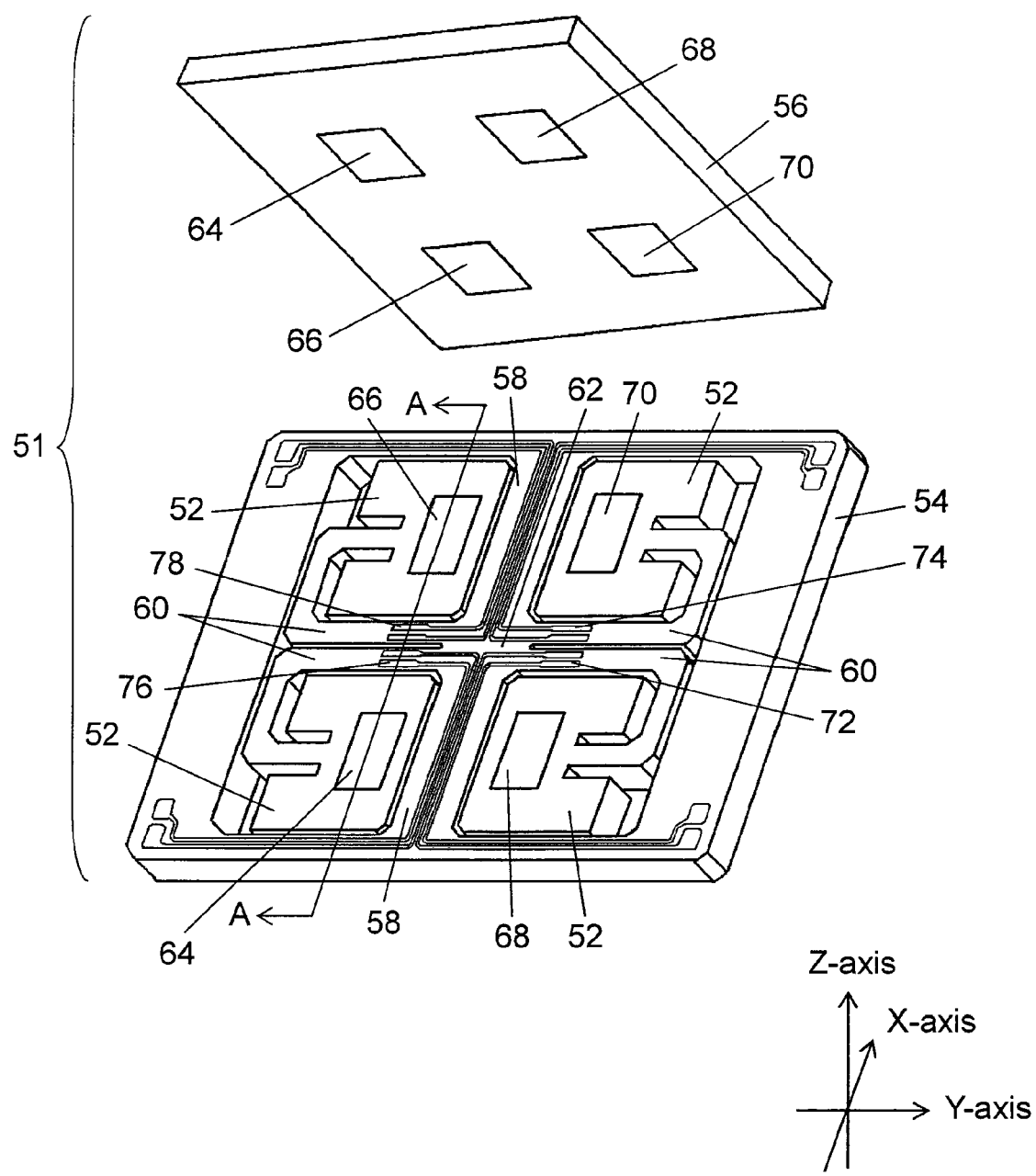
FIG. 15 shows an exploded perspective view of an acceleration sensor in accordance with a fourth embodiment of the present invention.
Figure 16:
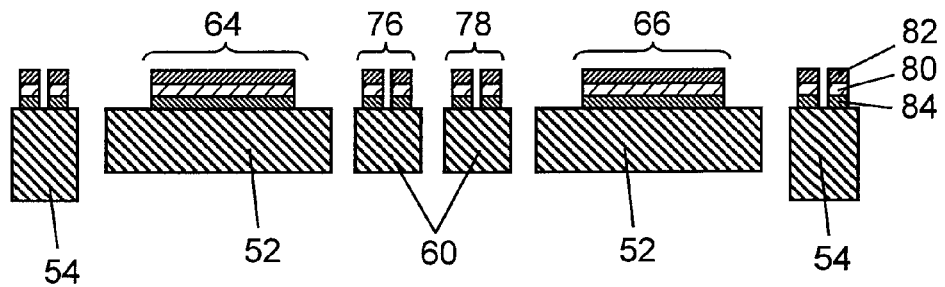
FIG. 16 shows a sectional view of the acceleration sensor cut along line A-A in FIG. 15.

FIG. 15 shows an exploded perspective view of the sensor in accordance with the fourth embodiment of the present invention. FIG. 16 shows a sectional view cut along line A-A in FIG. 15.

In FIG. 15, the sensor in accordance with this fourth embodiment is equipped with detecting element 51 that includes an acceleration sensor and an angular velocity sensor. Detecting element 51 comprises the following structural elements:

rigid section 54 connected to weight 52 via a flexible section;
substrate 56 confronting weight 52;
a first electrode section formed of opposed electrodes placed on the opposed faces of weight 52 and substrate 56; and
a second electrode section (another electrode section) placed on the flexible section.

Substrate 56 corresponds to the substrate described in the section of "DISCLOSURE OF INVENTION".

To be more specific, detecting element 51 includes two orthogonal arms formed by connecting one first arm 58 to two second arms 60 along an orthogonal direction, and supporter 62 for supporting first ends of two first arms 58, and frame-like rigid section 54 connecting a second end of first arm 58 to another second end of another first arm 58. Each one of first arms 58 is formed tremendously thinner than each one of second arms 60. Each one of second arms 32 is bent to form a J-shape so that a tip of the bent portion confronts the remaining portion. Weight 52 is connected to the tip of the bent portion of respective second arms 60. Two first arms 58 and supporter 62 are placed almost linearly and approximately on the same straight line. First arms 58 as well as second arms 60 are placed symmetrically with respect to the center of detecting element 51. In this embodiment, each one of four second arms 60 corresponds to the arm described in the section of "DISCLOSURE OF INVENTION".

The flexible section is referred to as a portion that connects rigid section 54 to weight 52, and corresponds to first arms 58, second arms 60, and supporter 62.

Substrate 56 is placed confronting weight 52, and first-fourth opposed electrodes 64, 66, 68, 70 are placed as the first electrode section on the opposed faces of weight 52 and substrate 56. First two second arms 60 confronting each other are equipped with driving electrode 72 for driving and vibrating weight 52 and detecting electrode 74. Second two second arms 60 confronting each other are equipped with first sensing electrode 76 and second sensing electrode 78 for sensing distortion of second arms 60. Those electrodes, i.e. driving electrode 72, detecting electrode 74, first sensing electrode 76 and second sensing electrode 78 correspond to the second electrode section.

As shown in FIG. 16, first-fourth electrodes 64, 66, 68, 70, driving electrode 72, detecting electrode 74, first sensing electrode 76, and second sensing electrode 78 placed on weight 52 are respectively formed of upper electrode 82 and lower electrode 84 with piezoelectric layer 80 existing therebetween. Upper electrode 82 and lower electrode 84 of each one of first-fourth opposed electrodes 64, 66, 68, and 70 are shorted with each other on, e.g. rigid section 54. In other words, lead wires extended from each one of first-fourth opposed electrodes 64, 66, 68, and 70 reach rigid section 54 via second arms 60 and first arms 58 of the flexible section, and upper electrode 82 is shorted with lower electrode 84 at the ends of the lead wires.

Substrate 56, rigid section 54, first and second arms 58, 60, and weight 52 are made of silicon-based material (including glass or a material of which linear expansion coefficient is close to that of silicon), and rigid section 54, first and second arms 58 and 60, and weight 52 are unitarily molded. Substrate 56 and rigid section 54 are directly bonded to and fixed to each other. Adhesive or bumps can be used instead of the direct-bonding; however, the direct-bonding needs not taking a thickness of the adhesive or the bumps into consideration, so that the direct-bonding can maintain accurately the distances between the respective opposed faces of weight 52 and substrate 56.

As discussed above, the acceleration sensor is formed of rigid section 54, first arms 58, second arms 60, supporter 62, weights 52, substrate 56, and first-fourth electrodes 64, 66, 68, and 70. The angular velocity sensor is formed of first arms 58, second arms 60, supporter 62, weights 52, driving electrode 72, detecting electrode 74, first and second sensing electrodes 76, 78. Those acceleration sensor and angular velocity sensor are not formed discretely as a conventional one, but formed integrally and simultaneously, thereby forming detecting element 28.

Figure 17:
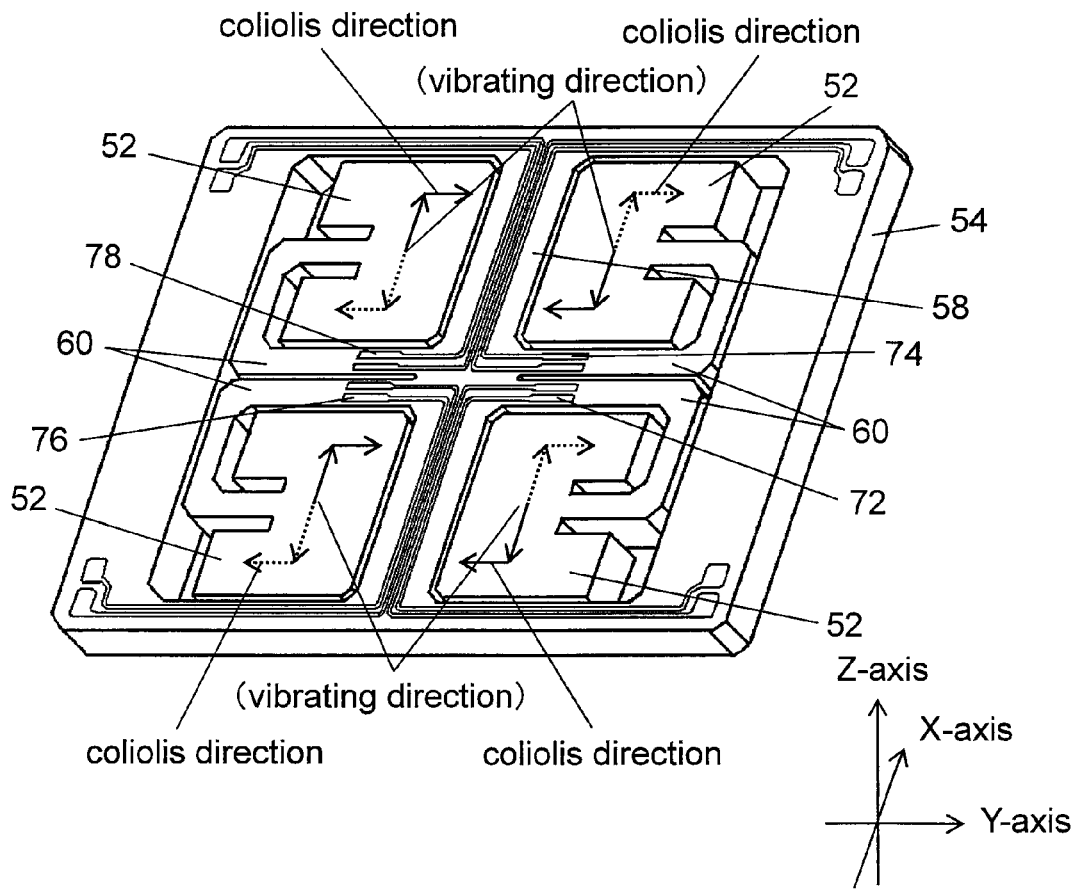
FIG. 17 shows a perspective view of a detecting element of the sensor shown in FIG. 15 before the detecting element is mounted onto a substrate.

Next, the angular velocity sensor and the acceleration sensor in accordance with this fourth embodiment are demonstrated hereinafter. First, the angular velocity sensor works as shown in FIG. 17, i.e. first arms 58 of detecting element 51 are placed along X-axis, where X-axis, Y-axis and Z-axis cross orthogonally each other, and second arms 60 are placed along Y-axis, then an AC voltage of a resonance frequency is applied to driving electrode 72, whereby second arms 60 are driven and vibrated. The zero point of the vibration is the second arm 60 at which driving electrode 72 is placed. This vibration entails vibrating weight 52 along an opposing direction between second arms 60 (along the solid-line arrow marks and dotted-line arrow marks shown in FIG. 17). All of four second arms 60 and four weights 52 vibrate tuning to each other along the opposing direction between second arms 60. Detecting element 51 thus vibrates along X-axis.

At this time, when an angular velocity occurs counterclockwise on Z-axis, Coriolis force occurs tuning to weight 52 and along the direction orthogonal to the driving direction of weight 52. This direction is referred to as Coriolis direction and marked with solid-line arrow marks and dotted-line arrow marks in FIG. 17. The angular velocity occurring counterclockwise on Z-axis produces distortion on second arms 60. In other words, a change in status of second arm 60, i.e. second arm 60 is bent by the Coriolis force, prompts first and second sensing electrodes 76, 78 to output a voltage. The angular velocity is detected based on this voltage.

Figure 18:
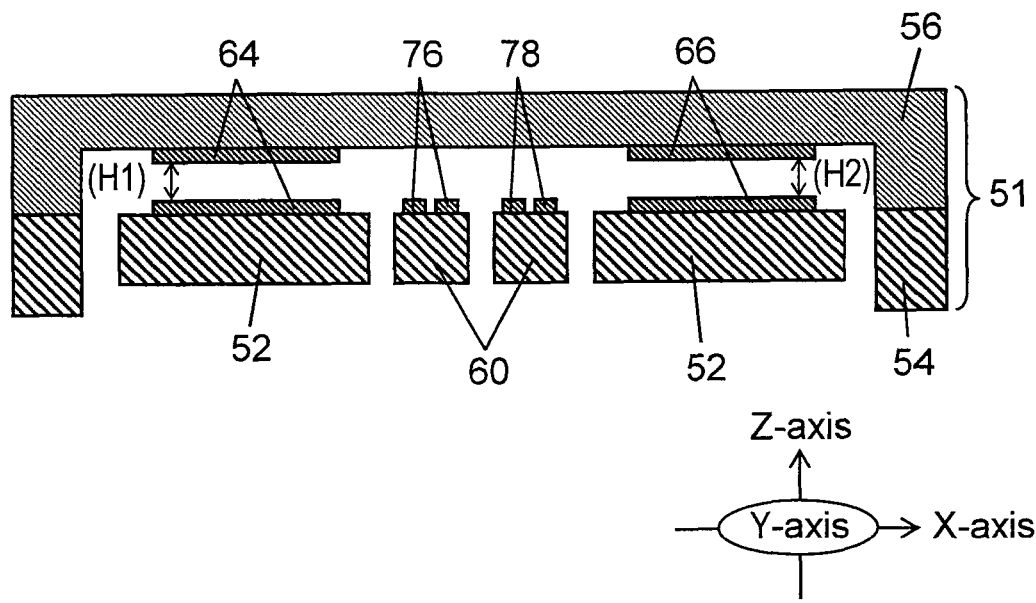
FIG. 18 shows a sectional view of the detecting element of the sensor shown in FIG. 15.

Next, the acceleration sensor is demonstrated hereinafter. As shown in FIG. 18, X-axis, Y-axis, and Z-axis are crossed each other orthogonally, and substrate 56 is placed on X-Y plane. In this condition, if no acceleration occurs, distance H1 between first opposed electrodes 64 placed on the opposed faces of substrate 56 and weight 52 is equal to distance H2 between second opposed electrodes 66 placed on the opposed faces of substrate 56 and weight 52. Although it is not shown in FIG. 18, the distance between second opposed electrodes 66 is equal to the distance between fourth opposed electrodes 70.

Figure 19:
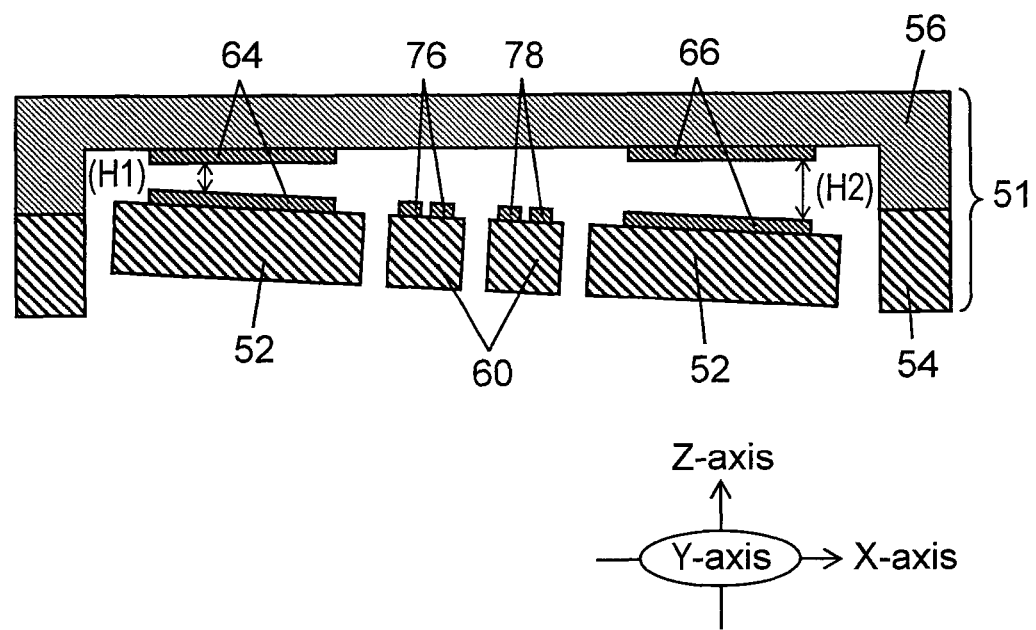
FIG. 19 shows a sectional view illustrating how the detecting element of the sensor shown in FIG. 15 works when acceleration occurs.
Figure 20:
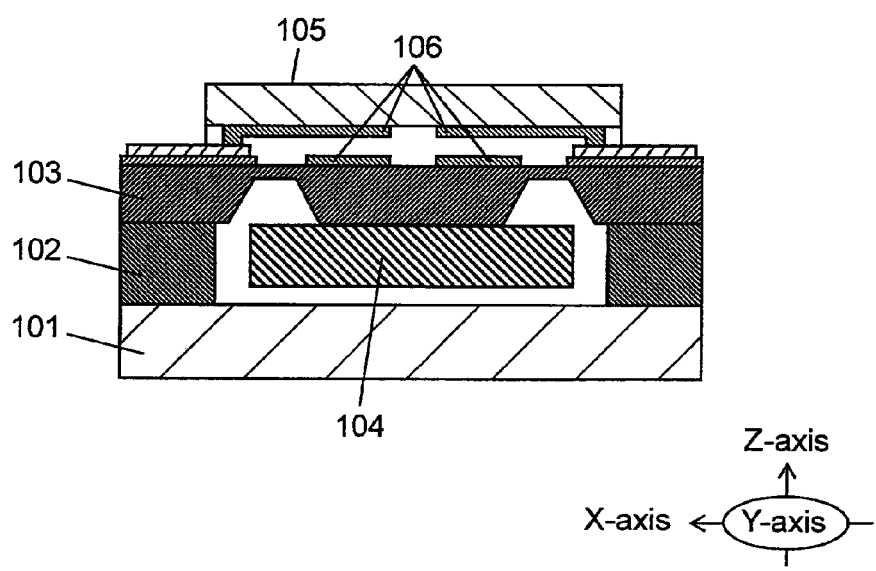
FIG. 20 shows a sectional view of a conventional acceleration sensor.

In this condition, acceleration occurs, e.g. along X-axis, then weight 52 is going to rotate on supporter 62 around Y-axis as shown in FIG. 19. As a result, distance H1 between first opposed electrodes 64 placed on the respective opposed faces of substrate 56 and weight 52 becomes smaller, while distance H2 between second opposed electrodes 66 placed on the opposed faces of substrate 56 and weight 52 becomes greater. Although it is not illustrated, the distance between third opposed electrodes 68 becomes smaller while the distance between fourth opposed electrodes 70 becomes greater.

On the other hand, when acceleration occurs along Y-axis, similar phenomenon to what is discussed above is observed, i.e. weight 52 is going to rotate on supporter 62 around X-axis, so that, although it is not illustrated, the distance between third opposed electrodes 68 becomes greater, and the distance between fourth opposed electrodes 70 also becomes greater, while the distance between first opposed electrodes 64 becomes smaller as well as second the distance between opposed electrodes 66 becomes smaller. In other words, detecting element 51 can detect the acceleration along X-axis or Y-axis based on the changes in electrostatic capacities between the respective electrodes.

The foregoing structure allows the acceleration sensor to detect an electrostatic capacity between the respective opposed electrodes of the first electrode section placed on weight 52 and substrate 56, thereby detecting acceleration. The foregoing structure also allows the angular velocity sensor to detect a status change, by using the second electrode section, of the flexible section bent by Coriolis force. In other words, one single detecting element 51 cab detect both of acceleration and angular velocity, thereby reducing the mounting area for structural elements. The sensor can be thus downsized. Since the first electrode section of the acceleration sensor and the second electrode section of the angular velocity sensor are formed of upper electrode 32, lower electrode 34, and piezoelectric layer 30 existing between upper and lower electrodes 32 and 34, so that they can be manufactured in the same manufacturing process. The sensor can be thus not only downsized but also improved its productivity.

In the opposed electrode placed on weight 52, upper electrode 82 is shorted to lower electrode 84 via piezoelectric layer 80, so that no electrostatic capacity occurs therebetween, thereby preventing the detection accuracy from degrading. The flexible section is placed symmetrically with respect to the center of detecting element 51, thereby preventing the detection accuracy from differing.

The flexible section is formed of at least four arms, so that when acceleration occurs along X-axis and/or Y-axis, weight 52 tends to rotate on supporter 62 around X-axis and/or Y-axis, so that acceleration along both of X-axis and/or Y-axis can be detected. A placement of four arms in a crisscross pattern and along X-Y direction allows weight 52 to rotate around X-axis and/or Y-axis with more ease, so that acceleration along X-axis and/or Y-axis can be detected with more ease.

Substrate 56, rigid section 54, the flexible section, and weights 52 are made of silicon-based material. Rigid section 54, the flexible section, and weights 52 are unitarily formed, and rigid section 54 is directly bonded to substrate 56. This structure produces less dispersion than those elements discretely formed, and is excellent in dimensional accuracy as a whole, so that detection accuracy can be improved.

Lead wires extended from the first electrode section placed on weight 52 reach rigid section 54 via the flexible section, and upper electrode 82 is shorted to lower electrode 84 at the ends of those lead wires. However, the present invention is not limited to this method for shorting upper electrode 82 and lower electrode 84.

In this embodiment, since the lead wires are extended from the first electrode section, the lead wires are also formed of upper electrode 82 and lower electrode 84, so that electrostatic capacity is available in the lead wires; however, the short between electrodes 82 and 84 prevents producing the electrostatic capacity in the lead wires.

INDUSTRIAL APPLICABILITY

The sensor of the present invention reduces a movement of the weight along Z-axis, thereby improving the detection accuracy, so that the sensor is useful for a variety of electronic devices employing an angular sensor and/or an acceleration sensor.

The invention claimed is:

1. A sensor comprising:
a detecting element including an acceleration sensor which comprises:
a weight coupled to a rigid section via a flexible section, the flexible section comprising:
a first arm coupled to the rigid section at a first end of the first arm, and
a second arm coupled orthogonally to the first arm at a second end of the first arm, the second arm being further coupled to the weight and supports the weight as a cantilever;
a substrate confronting the weight; and
an electrode section formed of opposed electrodes placed on respective opposed faces of the weight and the substrate,
wherein the substrate is formed of a first substrate and a second substrate confronting each other for sandwiching the weight along a gravitational direction, and the opposed electrodes are placed on the respective opposed faces of the weight, the first substrate and the second substrate respectively, and the acceleration sensor detects a change in an electrostatic capacity between the opposed electrodes for detecting acceleration.

2. The sensor of claim 1, wherein the acceleration sensor is equipped with a pressing section for depressing one of the weight and the flexible section, and the sensor detects a change in electrostatic capacity between the opposed electrodes.

3. The sensor of claim 2, wherein the pressing section depresses one of the weight and the flexible section for applying tensile stress to the flexible section.

4. The sensor of claim 2, wherein the pressing section depresses one of the weight and the flexible section along a direction identical to a gravitational direction.

5. The sensor of claim 2, wherein the flexible section is formed of at least four arms, and the arms are placed symmetrically with respect to a center of the detecting element.

6. The sensor of claim 2, wherein the pressing section shapes like one of a spindle, a bar, and a needle, and is brought into point-contact with one of the weight and the flexible section.

7. The sensor of claim 2, wherein the substrate, the rigid section, the flexible section, and the weight are made of silicon-based material, wherein the rigid section, the flexible section, and the weight are unitarily formed, and the rigid section is directly bonded to the substrate.

8. The sensor of claim 1, wherein the flexible section is placed symmetrically with respect to a center of the detecting element.

9. The sensor of claim 1, wherein the detecting element further comprises at least four weights including the weight, wherein respective weights couple to the rigid section via respective first arms and second arms, and the at least four weights are placed symmetrically with respect to a center of the detecting element.

10. The sensor of claim 1, wherein the first and the second substrates, the rigid section, the flexible section, and the weight are made of silicon-based material, wherein the rigid section, the flexible section, and the weight are unitarily formed, and the rigid section is directly bonded to the first and the second substrates.

11. A sensor comprising:
a detecting element including an acceleration sensor and an angular velocity element, the acceleration sensor comprises:
a weight coupled to a rigid section via a flexible section,
a substrate confronting the weight, and
an electrode section formed of opposed electrodes placed on respective opposed faces of the weight and the substrate; and
the angular velocity element comprises another electrode section placed on the flexible section,
wherein the electrode section placed on the weight and the another electrode section placed on the flexible section include respectively an upper electrode and a lower electrode with a piezoelectric layer existing between the upper and the lower electrodes,
wherein the acceleration sensor shorts the upper electrode to the lower electrode of the electrode section placed on the weight, and detects an electrostatic capacity between the opposed electrodes placed on the respective opposed faces of the weight and the substrate for detecting acceleration, and
wherein the angular velocity sensor detects a status change, caused by Coriolis force, of the flexible section, bent by Coriolis force, in the another electrode section for detecting angular velocity.

12. The sensor of claim 11, wherein the electrode section placed on the weight is extended to form a lead wire, which reaches the rigid section via the flexible section, and the upper electrode and the lower electrode are shorted with an end of the lead wire.

13. The sensor of claim 11, wherein the flexible section is placed symmetrically with respect to a center of the detecting element.

14. The sensor of claim 11, wherein the flexible section is formed of at least four arms, and the arms are placed symmetrically with respect to a center of the detecting element.

15. The sensor of claim 11, wherein the substrate, the rigid section, the flexible section, and the weight are made of silicon-based material, wherein the rigid section, the flexible section, and the weight are unitarily formed, and the rigid section is directly bonded to the substrate.

* * * * *